(12) United States Patent
Farrell

(10) Patent No.: US 7,520,662 B2
(45) Date of Patent: *Apr. 21, 2009

(54) RINSEABLE SPLASH SHIELD AND METHOD OF USE

(75) Inventor: James J. Farrell, Orinda, CA (US)

(73) Assignee: f'REAL? Foods, LLC, Orinda, CA (US)

( * ) Notice: Subject to any disclaimer, the term of this patent is extended or adjusted under 35 U.S.C. 154(b) by 479 days.

This patent is subject to a terminal disclaimer.

(21) Appl. No.: 11/116,497

(22) Filed: Apr. 28, 2005

(65) Prior Publication Data

US 2005/0201198 A1    Sep. 15, 2005

Related U.S. Application Data

(63) Continuation-in-part of application No. 10/715,171, filed on Nov. 17, 2003, now Pat. No. 7,144,150.

(60) Provisional application No. 60/426,622, filed on Nov. 15, 2002.

(51) Int. Cl.
*B01F 15/00* (2006.01)
*B08B 3/02* (2006.01)

(52) U.S. Cl. .................. 366/347; 366/348; 366/349; 134/115 R

(58) Field of Classification Search ............... 366/347, 366/348, 349; 134/115 R
See application file for complete search history.

(56) References Cited

U.S. PATENT DOCUMENTS 496,674 A    5/1893  Urbach 934,537 A    9/1909  Johnson
1,090,148 A  3/1914  Harr .......................... 366/207

(Continued)

FOREIGN PATENT DOCUMENTS

DE    2 158 002    5/1973

OTHER PUBLICATIONS

Product literature for Hamilton Beach Models 936 P and 908, entitled "Hamilton Beach Over 80 Years of Quality, Dependability & Service," Apr. 1992, 4 pages in length.
Arbuckle, "Ice Cream," 3rd Edition, (1977), pp. 54-55, 323-331.

*Primary Examiner*—Tony G Soohoo
(74) *Attorney, Agent, or Firm*—Stallman & Pollock

(57) ABSTRACT

The present application describes a method for rinsing a splash shield with water or a sanitizing solution. According to the disclosed method, a vessel containing contents to be mixed is positioned in a mixing machine, and a splash shield is positioned to shield the opening of the vessel. After the material within the vessel is mixed by a mixing element, the splash shield is separated from the vessel and rinsed by a nozzle on the mixing machine.

In another embodiment, a vessel containing contents to be mixed is positioned in a holder on a mixing machine, and a splash shield (which may or may not be rinseable) is positioned over the opening of the vessel. The contents of the vessel are mixed using a mixing element. During and/or after mixing, opposed relative movement of the mixing element and vessel may occur, creating an upward lifting force on the vessel. The weight of the shield is sufficient to overcome this upward lifting force on the vessel and thereby causes the vessel to remain seated in the holder.

22 Claims, 5 Drawing Sheets

U.S. PATENT DOCUMENTS

| | | | |
|---|---|---|---|
| 1,313,830 A | 8/1919 | Minsk | |
| 1,496,611 A | 6/1924 | Siegel | 366/207 |
| 1,560,826 A | 11/1925 | Kirschbraun | 366/168.1 |
| 1,847,226 A | 3/1932 | Ringwald | 366/207 |
| 1,911,202 A | 5/1933 | Nielsen | 366/207 |
| 1,913,210 A | 6/1933 | Parker | 366/207 |
| 2,003,259 A | 5/1935 | Gilbert et al. | 366/207 |
| 2,012,486 A | 8/1935 | Strauss | 366/199 |
| 2,026,240 A | 12/1935 | Luxmore | 259/99 |
| 2,031,770 A | 2/1936 | Gilbert et al. | 366/199 |
| 2,072,691 A | 3/1937 | Stark | 99/60 |
| 2,115,809 A | 5/1938 | Goldman | 259/99 |
| 2,134,759 A | 11/1938 | Howlett | 220/231 |
| 2,667,423 A | 1/1954 | Simpson | 99/171 |
| 2,668,765 A | 2/1954 | Stimpson | 99/55 |
| 2,701,131 A | 2/1955 | Love | 259/126 |
| 2,863,776 A | 12/1958 | Lisher | 99/136 |
| 2,898,094 A | 8/1959 | O'Neil, Jr. | 259/116 |
| 2,941,885 A | 6/1960 | Tomlinson | 99/54 |
| 2,967,433 A | 1/1961 | Phillips | 74/16 |
| 3,154,123 A | 10/1964 | Tomlinson | 146/68 |
| 3,171,635 A | 3/1965 | Haentjens et al. | 259/4 |
| 3,295,997 A | 1/1967 | Tomlinson et al. | 99/275 |
| 3,365,304 A | 1/1968 | Guterman et al. | 426/565 |
| 3,503,757 A | 3/1970 | Rubenstein | 99/136 |
| 3,514,080 A | 5/1970 | Price et al. | 259/19 |
| 3,647,472 A | 3/1972 | Speech et al. | 99/34 |
| 3,665,722 A | 5/1972 | Cornelius | 62/68 |
| 3,738,619 A | 6/1973 | Shirae | 259/108 |
| 3,865,353 A | 2/1975 | Fischer | 259/118 |
| 3,889,002 A | 6/1975 | Clausi et al. | 426/576 |
| 3,922,361 A | 11/1975 | Vann | 426/599 |
| 3,939,001 A | 2/1976 | Clausi et al. | 106/136 |
| 3,949,098 A | 4/1976 | Bangert | 426/324 |
| 4,096,893 A | 6/1978 | Harvey, Jr. et al. | 141/90 |
| 4,169,681 A | 10/1979 | Kato | 366/244 |
| 4,358,298 A | 11/1982 | Ratcliff | 55/185 |
| 4,434,186 A | 2/1984 | Desia et al. | 426/565 |
| 4,544,277 A | 10/1985 | Schnellmann | 366/78 |
| 4,547,076 A | 10/1985 | Maurer | 366/244 |
| 4,637,221 A | 1/1987 | Levine | 62/342 |
| 4,708,487 A | 11/1987 | Marshall | 366/206 |
| 4,708,489 A | 11/1987 | Carlson | 366/149 |
| 4,828,866 A | 5/1989 | Wade et al. | 426/599 |
| 4,842,884 A | 6/1989 | Bookwalter et al. | 426/585 |
| 5,114,045 A | 5/1992 | Herpe | 222/105 |
| 5,145,250 A | 9/1992 | Planck et al. | 366/8 |
| 5,150,967 A | 9/1992 | Neilson et al. | 366/206 |
| 5,328,263 A | 7/1994 | Neilson | 366/254 |
| 5,439,289 A | 8/1995 | Neilson | 366/207 |
| 5,580,007 A | 12/1996 | Caviezel et al. | 241/199.12 |
| 5,599,103 A | 2/1997 | Linscott | 366/343 |
| 5,803,377 A | 9/1998 | Farrell | 241/36 |
| 5,962,060 A | 10/1999 | Farrell | 426/565 |
| 6,326,047 B1 | 12/2001 | Farrell | 426/524 |
| 6,453,803 B1 | 9/2002 | Sodeyama et al. | 99/348 |
| 6,474,862 B2 | 11/2002 | Farrell | 366/147 |
| 7,144,150 B2 * | 12/2006 | Farrell | 366/197 |

* cited by examiner

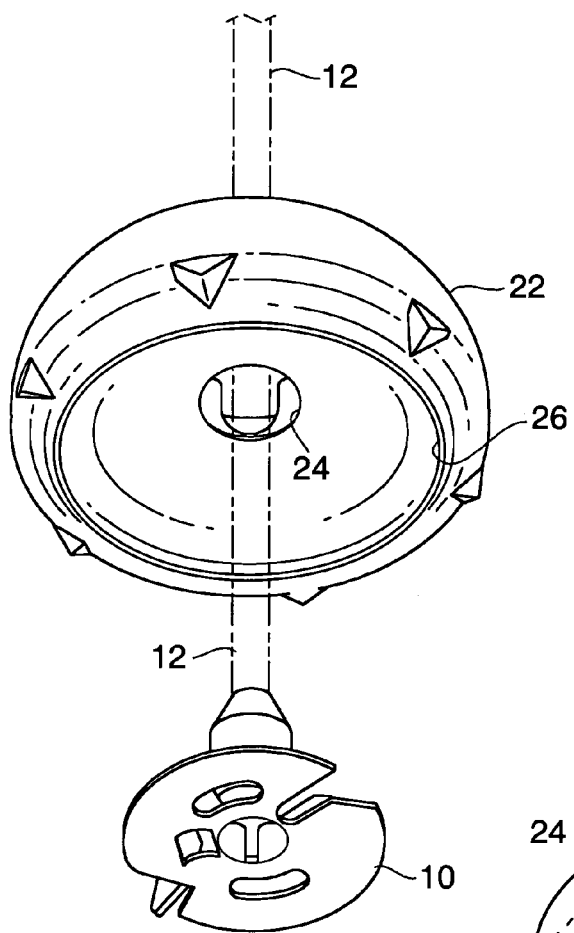
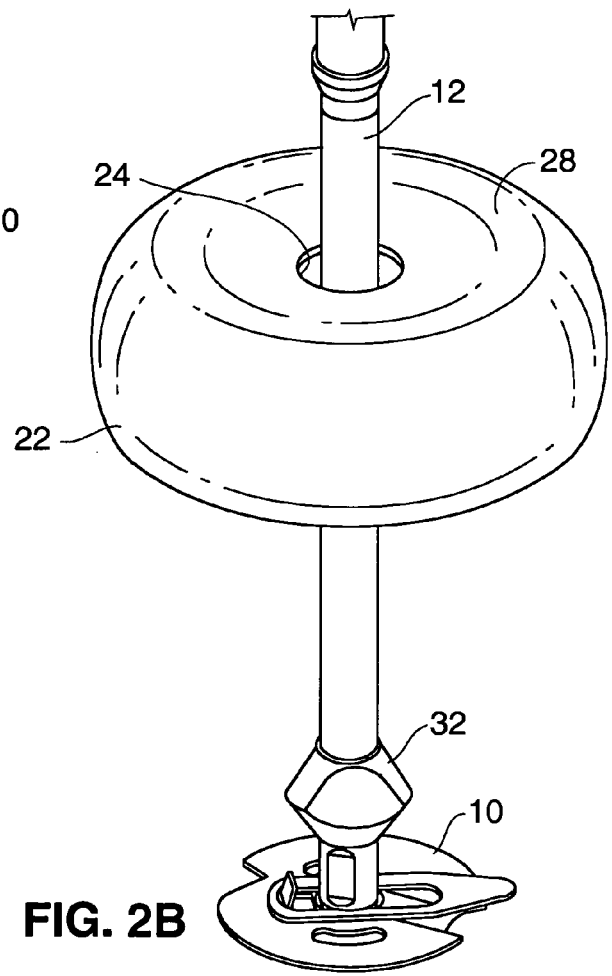

RINSEABLE SPLASH SHIELD AND METHOD OF USE

PRIORITY

This application is a continuation-in-part of U.S. application Ser. No. 10/715,171, filed Nov. 17, 2003 now U.S. Pat. No. 7,144,150, which claims the benefit of Provisional Application No. 60/426,622, filed Nov. 15, 2002.

FIELD OF THE INVENTION

The present invention relates generally to the field of machines for mixing liquids, and specifically to devices for preventing splashing of liquids during mixing.

BACKGROUND OF THE INVENTION

Preparation of certain foods and beverages can involve blending, whipping, stirring, etc., the food or beverage. This may be done using a rotary blade or mixer which is lowered into a container holding the food or beverage, or which is held in place as the container is advanced towards the rotary blade/mixer to move the container's contents into contact with the blade/mixer.

In Applicant's U.S. Pat. Nos. 6,474,862, 6,326,047 and 5,803,377, entitled APPARATUS AND METHOD FOR MAKING FROZEN DRINKS, the disclosures of which are incorporated herein by reference, methods for making frozen drinks are described. These patents describe a machine that allows a milkshake or other frozen drink to be quickly made from a block of ingredients pre-frozen into a serving cup. The frozen contents within the serving cup are broken into small frozen particles using a rotating blade, and blended with an added liquid also using the rotating blade.

According to the patents, when a milkshake or other frozen drink is to be made, a serving cup containing the frozen block is positioned in a cup holder which forms a part of the frozen drink machine. A rotating blade is lowered into the cup and bores through the frozen substance in the cup, grinding it into small frozen particles. As the blade moves towards the bottom interior of the cup, milk, water, or another liquid is added to the cup and is blended into the frozen substance by the rotating blade. Alternatively, the rotating blade may be held at a fixed elevation, and the cup may be advanced towards the blade to move the cup's contents into contact with the blade. In either case, the cup and/or blade may be reciprocated to allow the full contents of the cup to be mixed.

During mixing, material can splash from the cup onto the drink machine and surrounding area. U.S. Pat. Nos. 5,328,263 and 5,439,289 (Neilson) each describe a separate, dedicated lid placement mechanism that positions a lid onto a cup so as to minimize such splashing when the contents of the cup are being mixed. U.S. Pat. No. 5,145,250 (Planck) describes a mixing device wherein a lid and mixing device move axially together until the lid makes contact with the receptacle, at which time springs keep the lid in contact with the receptacle as the mixing head travels further into the receptacle. In each case, there is potential for carryover of mixed ingredients from one batch to the next. In Planck, a disposable cover over the pressure plate of the lid is described. In Neilson U.S. Pat. No. 5,439,289 a provision for a releasable lid connector means is claimed to enable cleaning of the lid remotely from the mixing device. It is further desirable, however, to provide a drink mixer having a splash shield that may be automatically rinsed following mixing of each batch or beverage, preferably without disassembly or removal of any components or disposable covers.

SUMMARY OF THE INVENTION

The present application describes a method for rinsing a splash shield According to the disclosed method, a vessel containing contents to be mixed is positioned in a mixing machine, and a splash shield is positioned to shield the opening of the vessel during mixing. After the material within the vessel is mixed by a mixing element, the splash shield is separated from the vessel by the mixing machine and rinsed by a nozzle(s) on the mixing machine.

In another embodiment, a vessel containing contents to be mixed is positioned in a holder on a mixing machine, and a splash shield (which may or may not be rinseable) is positioned to shield the opening of the vessel. The contents of the vessel are mixed using a mixing element. During and/or after mixing, opposed relative movement of the mixing element and vessel may occur, creating an upward lifting force on the vessel that may cause it to lift out of the holder. The weight of the shield is sufficient to overcome this upward lifting force on the vessel and thereby causes the vessel to remain seated in the holder.

BRIEF DESCRIPTION OF THE DRAWINGS

FIG. 2A is a bottom perspective view showing a splash shield, shaft and mixing blade of FIG. 1A, with the splash shield displaced from the mixing blade. For clarity, the portion of the shaft passing through the splash shield is not shown.

FIG. 2B is a top perspective view of the components shown in FIG. 1A.

DETAILED DESCRIPTION OF THE DRAWINGS

Figure 1A:
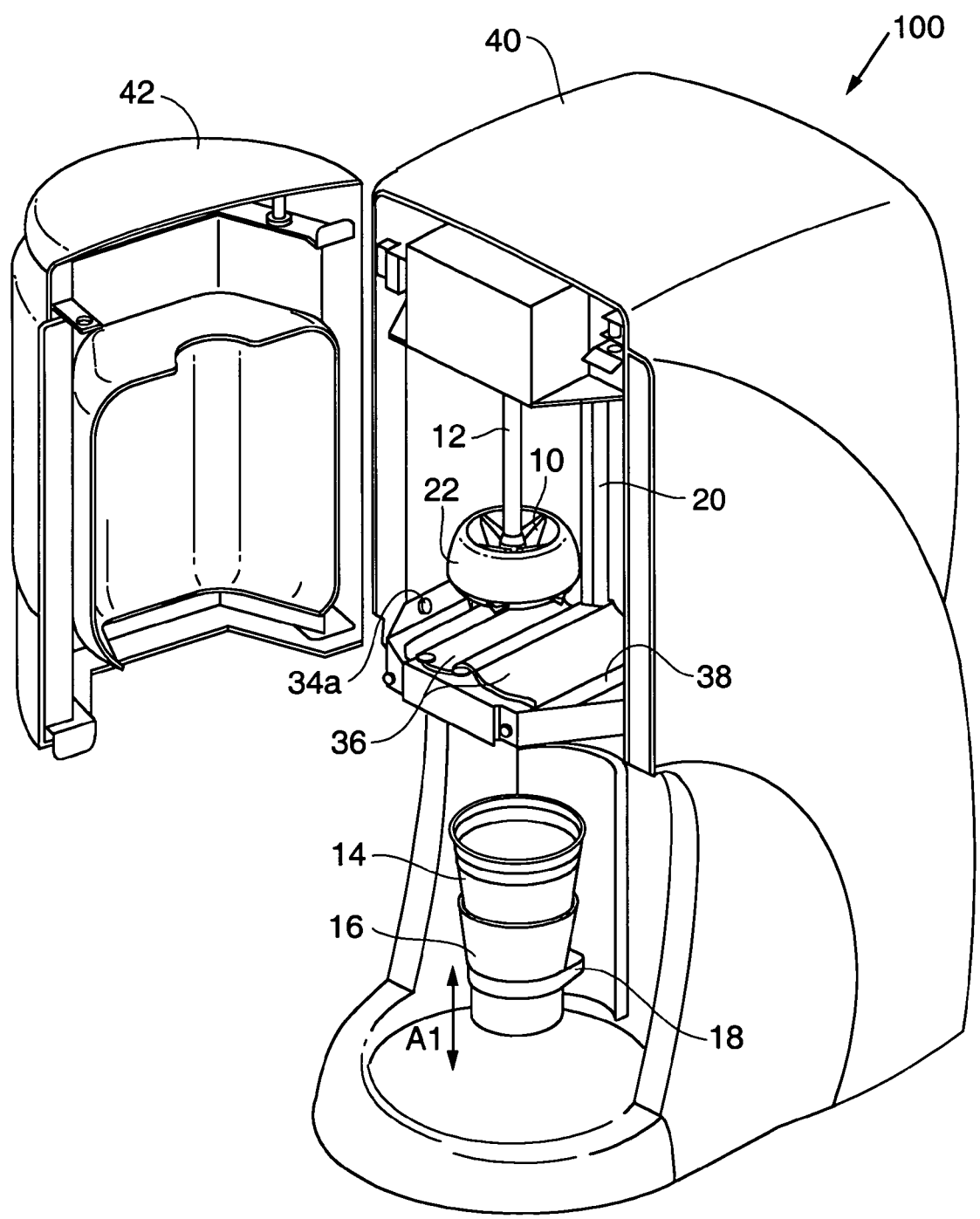
FIG. 1A is a top perspective view of a drink machine having a rinseable splash shield.

Referring to FIG. 1, the splash shield disclosed in this application is preferably provided as a component of a mixing/blending machine 100 that uses a rotating blade to mix/blend the contents within a cup or other vessel. Machine 100 may be a machine such as the f'REAL! Self-Serve Milkshake Blender available from f'REAL! Foods LLC, 37 Avenida de Orinda, Orinda, Calif., which is particularly useful for mixing/blending drinks such as frozen milkshakes, coffee drinks, or smoothies. However, it should be appreciated that the rinseable shield may be suitable for use on other types of machines for mixing and/or blending various materials, including powders, slurries and other types of liquids.

Machine 100 includes a mixing blade 10 carried on an elongate shaft 12. Mixing blade 10 is rotatable by means of a motor (not shown) and is designed to bore through the frozen substance in a cup 14. As described in greater detail in Applicants U.S. Pat. Nos. 6,474,862, 6,326,047 and 5,803,377, cup 14 is preferably a serving cup within which milkshake or other frozen drink ingredients have been pre-frozen into a block. A cup holder 16 supports the cup and is preferably moveable as indicated by arrow A1 in FIG. 1, to cause the mixing blade to blend the frozen drink in the cup. Although movement of the holder 16 can be achieved in various ways, in the FIG. 1 embodiment the cup holder 16 is mounted to a carriage 18 that is moveable along a vertical rail 20 by means of a motor and lead screw assembly (not shown) disposed within the machine 100. Mixing blade 10 is rotatable by means of a motor (not shown) and is designed to bore through the frozen substance in the cup. As described in Applicant's prior patents, water, milk or another liquid is added to the cup for blending with the frozen substance, which is broken up into small frozen particles by the boring blade 10. The added liquid may be directed into the cup from above, such as through a fluid outlet 19 (FIG. 1B) oriented adjacent to the shaft.

As discussed, during mixing, the cup 14 is preferably reciprocated by cup holder 16 as indicated by arrow A1 in FIG. 1A, to cause the rotating blade 10 to pass through the contents of the cup one or more times. Obviously, the blade 10 may include a second motor for moving the shaft 12 longitudinally, in which case the need for the motor associated with cup holder 16 would be eliminated.

Referring to FIGS. 2A and 2B, splash shield 22 is preferably proportioned to seat along the upper edge of cup 14. The shield includes an upper opening 24 and a larger lower opening 26. Shaft 12 extends through the openings 24, 26 such that the mixing blade 10 is positioned beneath the shield 22. Opening 24 is preferably proportioned such that ingredients (e.g. milk, water, heated water, or other liquid) can be directed from fluid outlet 19 (FIG. 1B) into the cup 14 via opening 24, but also to minimize splashing of material through this opening in the shield. If desired, a separate opening for receiving ingredients may be used instead of, or in addition to, opening 24.

Figure 2C:
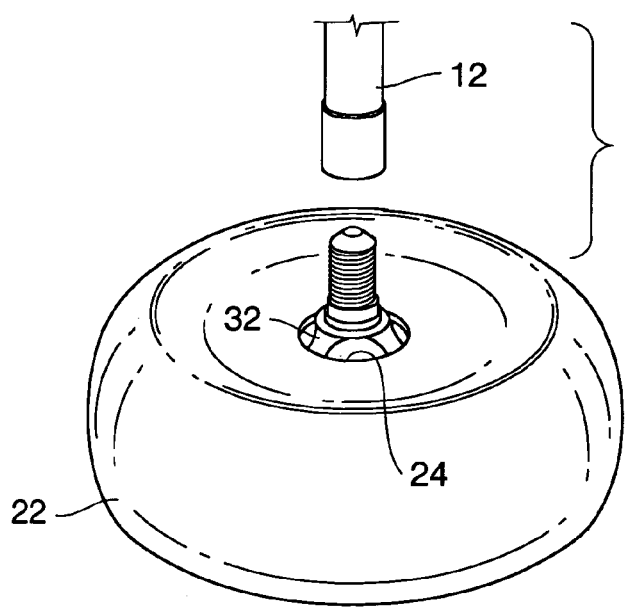
FIG. 2C is a top perspective view of the shaft engaged with the splash shield.
Figure 3:
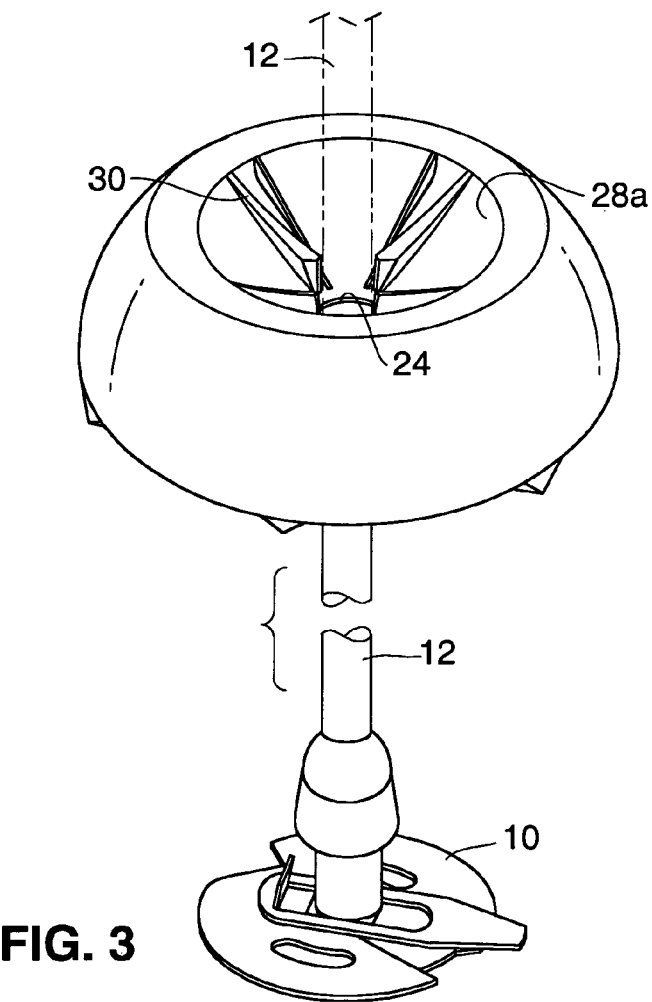
FIG. 3 is a top perspective view similar to FIG. 2B showing an alternative splash shield.

Shaft 12 includes an outwardly tapered portion 32, such that the tapered portion 32 engages the circumference of the opening 24 (see FIG. 2C) when the shield is lowered relative to the shaft. When the shield is raised relative to the shaft, the shield 22 and tapered portion 32 separate as in FIGS. 2A and 2B. Alternatively, spaced apart ribs 30 (FIG. 3) may be optionally positioned along the wall 28 to contact the tapered portion 32 of the machine's mixing shaft (as shown in FIG. 1) when the shield 22 is lowered relative to the shaft.

Shield 22 may have a dome-shaped configuration as shown, although other configurations would be equally suitable. As shown in FIG. 2B, a wall 28 tapers inwardly from the uppermost surface of the shield 22 down to the upper opening 24. Wall 28 helps to funnel added water or other ingredients down towards opening 24 and can help to prevent spillage of the ingredients when the stream of ingredients to be added is offset from the opening 24. The wall 28 is preferably smooth and free of surface features which might encourage accumulation of splattered milkshake material or which might interfere with cleaning of the wall. A similar wall 28a is shown in the alternative embodiment of FIG. 3.

The shield may be weighted as described in greater detail in the "Operation" section below. Additionally, the shield is preferably shaped such that when it is suspended from the shaft 12, its center of gravity is below the area of contact between the shaft and the shield. This helps to avoid tipping of the shield to one side relative to the shaft, keeping it aligned with the shaft and upper edge of cup 14.

Referring again to FIGS. 1A and 1B, one or more nozzles 34a, 34b (only one is shown in FIG. 1A) are provided for directing rinsing fluid into the interior of shield 22. For example, nozzle 34b may be oriented to direct rinse fluid downwardly towards wall 28 and opening 24, and a second nozzle 34a may be oriented to direct rinse fluid upwardly into contact with the underside of the shield. Nozzles 34a, 34b are coupled to one or more sources of rinse fluid, such as water (preferably hot or warm water) and/or sanitizing solution such as a quaternary ammonium sanitizer solution. Providing rinse fluid that is warm or hot (e.g. having a temperature in the range of 100 F to 180 F) can significantly accelerate the killing of bacteria by the sanitizing solution or other rinse fluid.

Figure 1B:
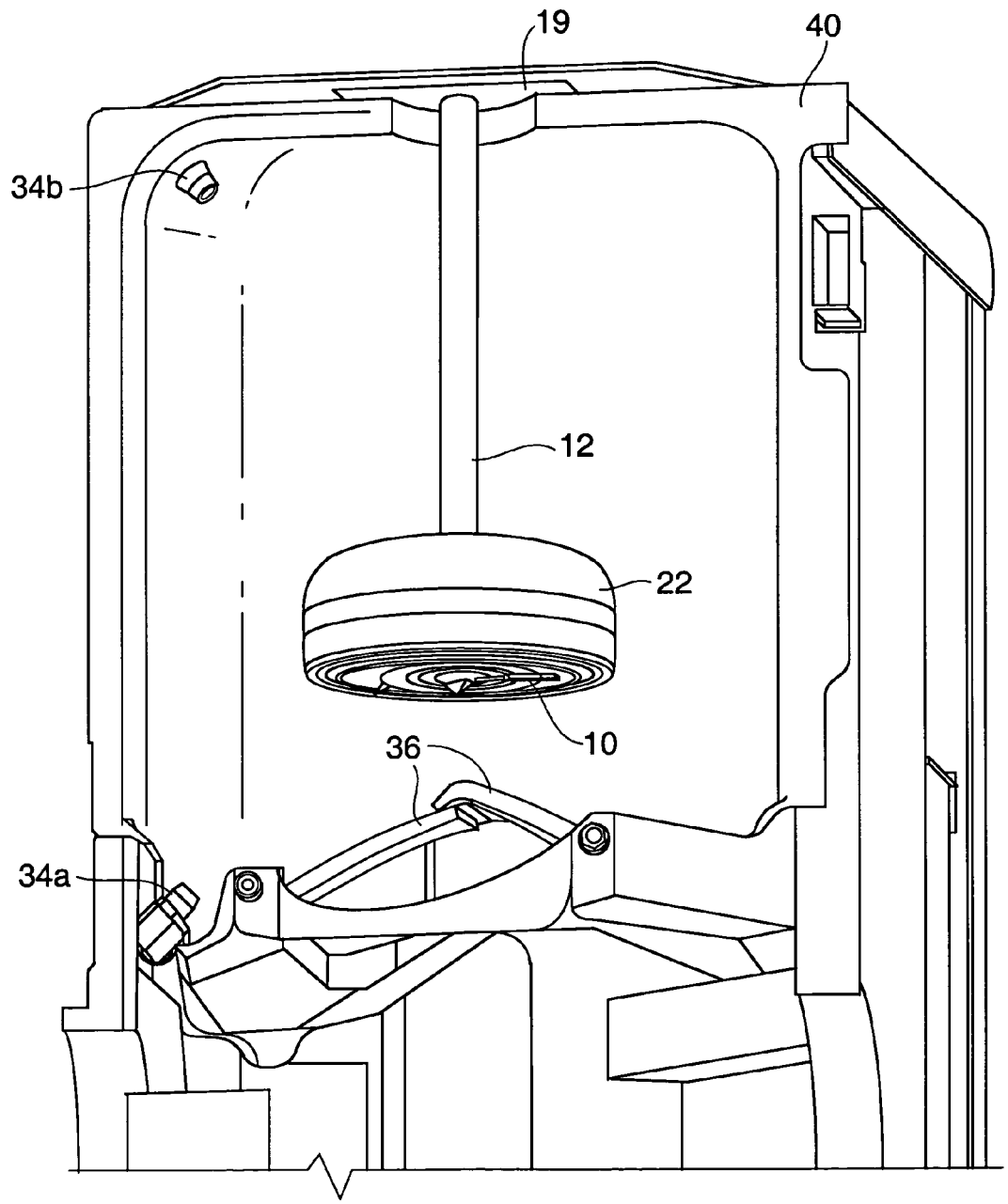
FIG. 1B is a perspective view showing the enclosure of the drink machine of FIG. 1A with the access door removed and with the hinged doors in the closed position. A portion of the structure supporting the hinged doors is cut away for clarity.

Machine 100 includes a pair of automatic hinged doors 36 along the path of travel of holder 16. A fluid trough 38 for receiving rinse water shed from the shield surrounds the hinged doors. A drain line (not shown) is fluidly coupled to the trough, and the trough includes gradients arranged to direct water towards the drain line. As can be seen in FIGS. 1A and 1B, when the doors 36 are closed they are positioned at a sloped angle, thus allowing rinse water flowing from the shield to flow onto one of the doors and then flow down the slope of the door and into the trough. The trough 38, rinse nozzle 34, shaft 12, shield 22 and mixing element are preferably positioned within an enclosure 40 having an access door 42 (as shown in FIG. 1).

A controller (not shown) within the machine controls operation of the motors for the cup holder, blade and hinged doors, as well as the liquid dispense and rinsing functions.

OPERATION

Figure 4:
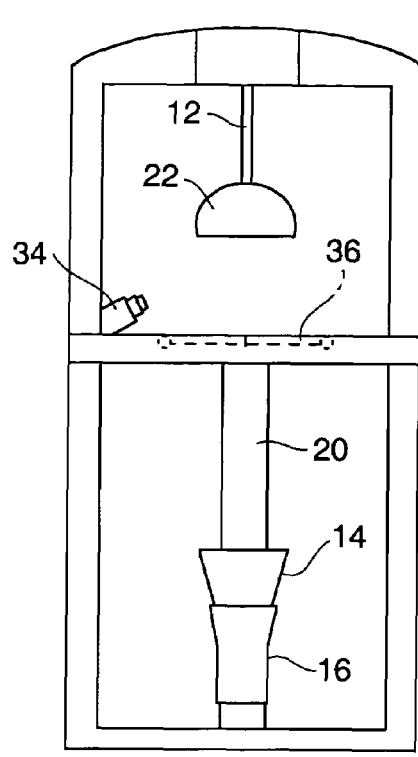
FIGS. 4 through 7 are a sequence of front elevation views of the drink machine of FIG. 1 illustrating use of the rinseable splash shield.
Figure 5:
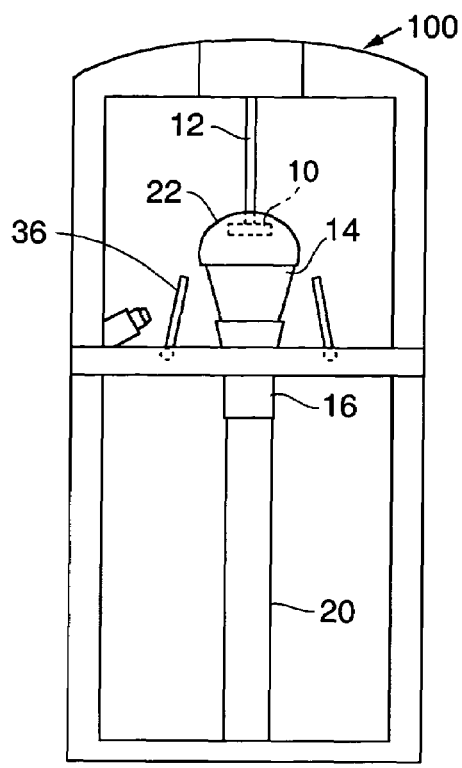
Figure 6:
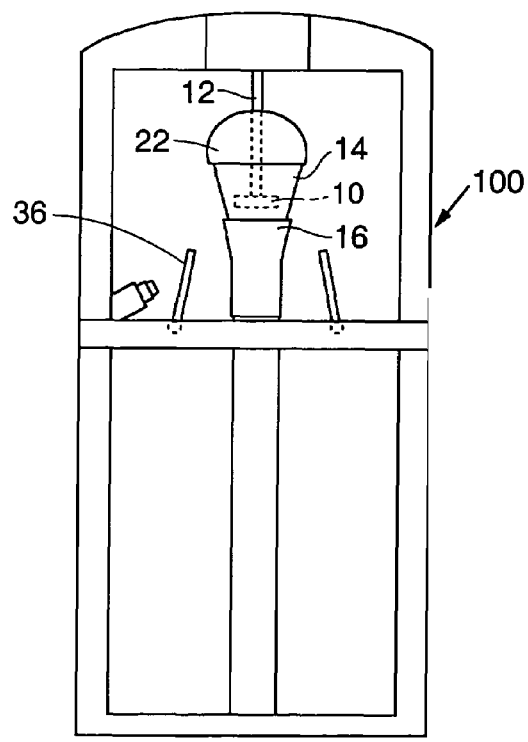

FIGS. 4-7 are a sequence of drawings that illustrate operation of the rinseable splash shield, which in its preferred form may be rinsed without disassembly or removal of any components or disposable covers. First, a cup 14 containing frozen ingredients is positioned in cup holder 16 as shown in FIG. 4 and the user depresses a "start" button (not shown) on the exterior of the machine 100. Next (FIG. 5), hinged doors 36 are opened and holder 16 is moved upwardly along rail 20, thereby moving the upper edge of cup 14 into contact with the shield 22. Continued upward movement of the holder 16 causes the shield 22 to be raised upwardly on the shaft, and the tapered section 32 of the shaft 12 to separate from the opening 24 (or ribs 30) of the shield 22, as the cup 14 moves up around the blade 10, as shown in FIG. 6. Rotation of the blade is activated (or may be activated at an earlier stage), and water, milk or other fluid may be directed into the cup as described in Applicant's earlier patents listed above, causing the frozen beverage to be made. The fluid may be introduced through the opening 24 in the shield. During mixing/blending the holder 16 (or the blade) may be reciprocated to allow the blade to pass through the full contents of the cup more than one time.

It should be noted that the shield 22 may be weighted to ensure a good seal with the cup. This eliminates the need for springs, as disclosed in Plank U.S. Pat. No. 5,145,250, or some other mechanism such as those described in Neilson U.S. Pat. Nos. 5,328,263 and 5,439,289, to hold the shield in position during mixing. Weighting the shield is of further advantage if it is heavy enough to create sufficient downward force on the cup to overcome any upward force created by the mixing blade being moved upwardly in the cup. The mixing blade can create such upward force as the mixing blade moves upwardly in the cup, imparting an upward force on the cup as a result of suction force or the viscous nature of the product being mixed in the cup. This can occur when the cup is lowered by the holder during mixing (i.e. when the cup is reciprocated to cause the mixing blade to pass through the cup's contents several times) and/or when the cup is lowered away from the blade after blending/mixing. Making the weight of the shield sufficient to overcome this upward lifting force on the cup causes the cup to remain seated in the cup holder without any other mechanical means of retaining it in the cup holder, such as clamping or gripping mechanisms or the springs or lid placement and retention mechanisms previously described. In one embodiment, the shield may be cast stainless steel having a weight of approximately 5 lbs. It should be noted that a weighted splash shield may be provided even if the rinsing feature is not present.

Once the beverage is made, the cup holder 16 is lowered and thereby moves the cup 14 downwardly away from the blade. The descending cup carries the shield 22 downwardly until the opening 24 (or ribs 30) of the shield engages tapered portion 32 of the shaft 12. At this point, the cup 14 separates from the shield 22 and is moved by the holder 16 to the position shown in FIG. 4. The cup may then be removed from the drink machine 100.

Figure 7:
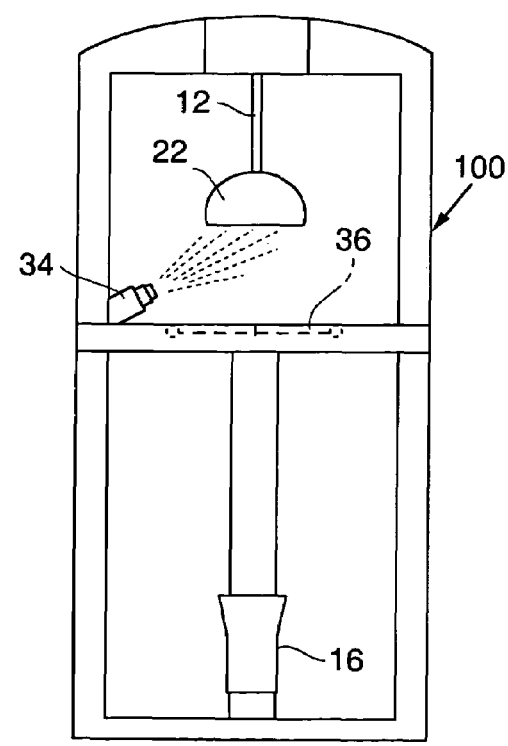

Next, the hinged doors 36 are closed and rinse fluid is directed onto the shield 22 using nozzles 34a, 34b as shown in FIG. 7. In the FIG. 1B embodiment, nozzle 34b directs rinse fluid onto the upper portion of the shield 22, and nozzle 34a directs fluid onto the underside of the shield 22, the blade 10, and the shaft 12. If desired, the shaft 12 may be rotated during and after rinsing. Given the weight of the splash shield and the contact between ribs 30 and tapered section 32 on the shaft, rotating the shaft 12 rotates the splash shield as well. Rotation may be of particular advantage since rotation allows the full surface of the shield 22 to be exposed to the fluid spray from the nozzles even if the nozzles are located to one side of the shield. Rotation also allows rinse water to be spun off the shield by centrifugal force, which can be a particular advantage if the rinse water contains sanitizing solution as this rotation minimizes clinging of the rinse water to the shield and associated transfer of sanitizing solution into subsequent drinks mixed by the drink machine. The shield, blade and closed doors 36 shed the rinse fluid into trough 38, which then directs the water out of the machine via the drain line.

I claim:

1. A method for rinsing a splash shield on a mixing machine, the method comprising the steps of:
    providing a vessel containing material to be mixed, the vessel including an opening;
    further providing a mixing machine having a holder for receiving the vessel at an access location in the mixing machine, a rotatable mixing element extendable into the vessel for mixing the material, a splash shield positionable to shield the opening of the vessel, and a nozzle oriented towards the splash shield;
    after mixing the material in the vessel using the mixing element and with the splash shield shielding the vessel opening, unshielding the vessel opening and directing hot rinsing fluid onto the splash shield using the nozzle while isolating the access location from the rinsing fluid.

2. The method of claim 1, wherein the directing step is performed automatically after the separating step.

3. The method of claim 1, wherein the holder is moveable in a first direction towards the splash shield and a second direction away from the splash shield and wherein the unshielding step includes the step of moving the holder in the second direction.

4. The method of claim 3, wherein:
    the mixing element is on a shaft;
    the splash shield is engageable with a portion of the shaft, the splash shield disengageable from that portion of the shaft in response to upward force against the shield, and mixing is carried out with the splash shield disengaged from that portion of the shaft;
    the step of moving the holder in the second direction separates the vessel and splash shield and causes the splash shield to engage with the portion of the shaft; and
    the method further includes the step of rotating the shaft to rotate the splash shield during the directing step.

5. The method of claim 1, further including the step of rotating the splash shield during the directing step.

6. The method of claim 1, wherein the directing step directs warm rinse fluid.

7. The method of claim 1, further including the step of directing rinsing fluid onto the mixing element.

8. The method of claim 1, wherein the method includes the steps of:
    with the mixing element in the material in the vessel, causing relative movement of the mixing element and vessel in opposite directions, and
    causing the splash shield to retain the vessel within the holder during relative movement of the mixing element and vessel in opposite directions.

9. The method of claim 8, wherein in the causing step the mass of the splash shield retains the vessel within the holder.

10. The method of claim 1, wherein the directing step directs a rinse solution comprising sanitizing solution.

11. The method of claim 10, wherein the sanitizing solution includes a quaternary ammonium sanitizer solution.

12. The method of claim 10, wherein the sanitizing solution is a heated sanitizing solution.

13. The method of claim 1, wherein the providing step provides an upwardly directed first nozzle and a downwardly directed second nozzle, and wherein the directing step directs fluid from the first and second nozzles.

14. The method of claim 1, wherein the providing step provides the splash shield to be positionable in contact with the vessel and covering the opening, and wherein the unshielding step includes separating the splash shield and the vessel.

15. The method of claim 1, wherein the providing step provides the mixing machine to include a chamber, and wherein the directing step includes isolating the splash shield within the chamber.

16. The method according to claim 1, wherein the providing step provides a barrier moveable into a position between the chamber and the access area, and wherein the isolating step includes moving the barrier to the position.

17. The method of claim 16, wherein the barrier includes a door moveable into a closed position covering the chamber, and wherein the isolating step includes moving the door to the closed position.

18. The method of claim 17, wherein the door is positioned at a sloped angle, and wherein the directing step includes allowing rinse fluid flowing off of the splash shield to contact the door and then flow down the slope and off the door into a receiving channel and into a drain.

19. The method of claim 18 wherein the holder is moveable between a first position in which the opening of vessel is external to the chamber and a second position in which the opening of the vessel is within the chamber, and wherein the isolating step includes moving the holder from the second position to the first position and positioning the barrier between the holder in the first position and the chamber.

20. The method of claim 17, wherein the isolating step further includes moving the holder in a direction away from the chamber.

21. A method for rinsing a splash shield on a mixing machine, the method comprising the steps of:
    providing a vessel containing material to be mixed, the vessel including an opening;

further providing a mixing machine having a holder for receiving the vessel, a rotatable mixing element extendable into the vessel for mixing the material, a splash shield positionable to shield the opening of the vessel, and a nozzle oriented towards the splash shield;

after mixing the material in the vessel using the mixing element and with the splash shield shielding the vessel opening, unshielding the vessel opening and directing rinsing fluid onto the splash shield using the nozzle while isolating the vessel from the rinsing fluid.

22. The method of claim 21, wherein the isolating step isolates the holder from the rinsing fluid.

* * * * *